United States Patent
Shah et al.

(10) Patent No.: US 10,486,668 B2
(45) Date of Patent: Nov. 26, 2019

(54) SYSTEMS AND METHODS FOR REDUNDANT WHEEL SPEED SENSING

(71) Applicant: Robert Bosch GmbH, Stuttgart (DE)

(72) Inventors: Ankit R. Shah, Canton, MI (US); Karl Dresen, Sterling Heights, MI (US); Steven M. Holton, Hamburg Township, MI (US); Anthony J. Farrell, Clinton, MI (US)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 15/679,188

(22) Filed: Aug. 17, 2017

(65) Prior Publication Data
US 2019/0054909 A1 Feb. 21, 2019

(51) Int. Cl.
*B60T 8/88* (2006.01)
*B60T 7/12* (2006.01)
*B60T 7/22* (2006.01)
*B60T 8/00* (2006.01)
*B60T 8/17* (2006.01)
(Continued)

(52) U.S. Cl.
CPC ............... *B60T 8/885* (2013.01); *B60T 7/12* (2013.01); *B60T 7/22* (2013.01); *B60T 8/00* (2013.01); *B60T 8/17* (2013.01); *B60T 8/76* (2013.01); *B60T 13/662* (2013.01); *B60T 17/221* (2013.01); *B60T 8/329* (2013.01);
(Continued)

(58) Field of Classification Search
CPC . B60T 8/885; B60T 7/12; B60T 8/329; B60T 8/76; B60T 17/221; B60T 13/74; B60T 2270/413; B60T 2270/416; B60T 7/22; B60T 8/00; B60T 8/17; B60T 13/662; B60T 2201/022
See application file for complete search history.

(56) References Cited

U.S. PATENT DOCUMENTS 6,256,570 B1 * 7/2001 Weiberle .................. B60T 7/042
 188/170
8,386,144 B2 * 2/2013 Jackson .................. B60T 7/122
 303/20

(Continued)

*Primary Examiner* — Courtney D Heinle
(74) *Attorney, Agent, or Firm* — Michael Best & Friedrich LLP

(57) ABSTRACT

A braking system and method with redundant wheel speed sensing. In one example, the braking system includes a first electronic control unit connected to a first power supply and a second electronic control unit connected to a second power supply. The second electronic control unit is communicatively coupled to the first electronic control unit. The braking system also includes a first wheel speed sensor, a second wheel speed sensor, a third wheel speed sensor, and a fourth wheel speed sensor. The first wheel speed sensor and the second wheel speed sensor are directly coupled to and powered by the first electronic control unit and are communicatively coupled to the second electronic control unit. The third wheel speed sensor and the fourth wheel speed sensor are directly coupled to and powered by the second electronic control unit and are communicatively coupled to the first electronic control unit. The first electronic control unit and the second electronic control unit each configured to calculate a wheel speed from the first wheel speed sensor, the second wheel speed sensor, the third wheel speed sensor, and the fourth wheel speed sensor.

11 Claims, 3 Drawing Sheets

(51) Int. Cl.
*B60T 8/76* (2006.01)
*B60T 13/66* (2006.01)
*B60T 17/22* (2006.01)
*B60T 8/32* (2006.01)
*B60T 13/74* (2006.01)

(52) U.S. Cl.
CPC ......... *B60T 13/74* (2013.01); *B60T 2201/022* (2013.01); *B60T 2270/413* (2013.01); *B60T 2270/416* (2013.01)

(56) References Cited

U.S. PATENT DOCUMENTS

| | | | |
|---|---|---|---|
| 8,752,908 B2* | 6/2014 | Heise | B60T 7/042 303/122.04 |
| 9,592,709 B2* | 3/2017 | Taki | B60C 23/04 |
| 2013/0073100 A1* | 3/2013 | Seeley | G01R 19/2513 700/290 |
| 2014/0095044 A1* | 4/2014 | Kikawa | B60T 17/221 701/70 |
| 2015/0203082 A1* | 7/2015 | Forster | B60T 7/08 701/70 |
| 2016/0009259 A1* | 1/2016 | Joyce | B60T 17/221 701/70 |
| 2016/0311419 A1 | 10/2016 | Joyce et al. | |

\* cited by examiner

| | | FIRST WHEEL SPEED SENSOR | SECOND WHEEL SPEED SENSOR | THIRD WHEEL SPEED SENSOR | FOURTH WHEEL SPEED SENSOR |
|---|---|---|---|---|---|
| PROCESSING | DATA CALCULATION | FIRST ECU, SECOND ECU | FIRST ECU, SECOND ECU | FIRST ECU, SECOND ECU | FIRST ECU, SECOND ECU |
| | WHEEL SPEED CONFIGURATION | FIRST ECU, SECOND ECU | FIRST ECU, SECOND ECU | FIRST ECU, SECOND ECU | FIRST ECU, SECOND ECU |
| | DIRECTION INFO | FIRST ECU, SECOND ECU | FIRST ECU, SECOND ECU | FIRST ECU, SECOND ECU | FIRST ECU, SECOND ECU |
| MONITORING | | | | | |
| | WHEEL SPEED SENSOR TEST | FIRST ECU | SECOND ECU | SECOND ECU | FIRST ECU |
| | LINE MONITORING | FIRST ECU | SECOND ECU | SECOND ECU | FIRST ECU |
| | AIR GAP MONITORING | FIRST ECU | SECOND ECU | SECOND ECU | FIRST ECU |
| | PULSE WIDTH MONITORING | FIRST ECU | SECOND ECU | SECOND ECU | FIRST ECU |
| | WHEEL SPEED MONITORING | FIRST ECU | SECOND ECU | SECOND ECU | FIRST ECU |
| | HIGH END TIMER BUFFER MONITORING | FIRST ECU | SECOND ECU | SECOND ECU | FIRST ECU |

FIG. 3

SYSTEMS AND METHODS FOR REDUNDANT WHEEL SPEED SENSING

FIELD

Embodiments presented herein relate to the field of automotive control systems and, more particularly, to the monitoring of individual wheel speeds.

SUMMARY

Modern vehicles include electronic stability control, adaptive cruise control, collision avoidance systems, and other similar vehicle control systems that automatically apply the vehicle's brakes to control the speed and trajectory of a vehicle. The vehicle control systems are operated by one or more electronic control units ("ECUs") configured to receive inputs from sensors (for example, wheel speed sensors) and control components of the vehicle, for example, the vehicle's brakes. For example, a commercially-available stability control system sold under the brand name ESP by Robert Bosch GmbH, includes an ECU programmed to control a vehicle by applying braking forces to the wheels to improve vehicle stability. Other vehicles include a brake force booster ECU, which controls a vacuum-independent braking system booster. The ECUs (in the stability control system and the brake force booster) rely on an accurate indication of the vehicle's speed. The ECUs determine the vehicle's speed using data from one or more wheel speed sensors.

Typically, a primary ECU (for example, the stability control system ECU) is directly coupled to the vehicle's wheel speed sensors. The primary ECU calculates, using data received from the sensors, the individual wheel speeds. The calculated wheel speeds are transmitted over a bus from the primary ECU to a secondary ECU (for example, a brake force booster ECU). The secondary ECU may further process the calculated wheel speeds and forward the processed data to other vehicle subsystems. In the event of a failure of the primary ECU, the secondary ECU will not receive the individual wheel speed data necessary to control the braking system. As a consequence, a human driver must manually apply the brakes to safely stop or control the vehicle. However, in highly-automated or autonomous vehicles, a human driver may not be able to manually apply the brakes in time to safely stop or control the vehicle.

Therefore, embodiments described herein provide, among other things, systems and methods for redundant wheel speed sensing to continue providing wheel speed information to vehicle systems in the event of an ECU failure.

For example, one embodiment, provides a braking system. The system includes a first electronic control unit connected to a first power supply and a second electronic control unit connected to a second power supply. The second electronic control unit is communicatively coupled to the first electronic control unit. The braking system also includes a first wheel speed sensor, a second wheel speed sensor, a third wheel speed sensor, and a fourth wheel speed sensor. The first wheel speed sensor and the second wheel speed sensor are directly coupled to and powered by the first electronic control unit and are communicatively coupled to the second electronic control unit. The third wheel speed sensor and the fourth wheel speed sensor are directly coupled to and powered by the second electronic control unit and are communicatively coupled to the first electronic control unit. The first electronic control unit and the second electronic control unit each configured to calculate a wheel speed from the first wheel speed sensor, the second wheel speed sensor, the third wheel speed sensor, and the fourth wheel speed sensor.

Another example embodiment provides a method for controlling a braking system. The method includes providing power from a first power supply to a first electronic control unit. The first electronic control unit provides power to a first wheel speed sensor and a second wheel speed sensor directly coupled to the first electronic control unit. A second power supply provides power to a second electronic control unit communicatively coupled to the first electronic control unit. The second electronic control unit provides power to a third wheel speed sensor and a fourth wheel speed sensor directly coupled to the second electronic control unit. The first electronic control unit receives data from the first wheel speed sensor, the second wheel speed sensor, the third wheel speed sensor, and the fourth wheel speed sensor. The first electronic control unit calculates from the data, with an electronic processor, a first wheel speed, a second wheel speed, a third wheel speed, and a fourth wheel speed. The first electronic control unit transmits to the second electronic control unit, the first wheel speed, the second wheel speed, the third wheel speed, and the fourth wheel speed.

Other aspects of the invention will become apparent by consideration of the detailed description and accompanying drawings.

BRIEF DESCRIPTION OF THE DRAWINGS

FIG. 3 is a table illustrating types of redundant self-data monitoring and individual failsafe monitoring tests performed by an ECU of the braking system of FIG. 1.

DETAILED DESCRIPTION

Before any embodiments are explained in detail, it is to be understood that the embodiments are not limited in their application to the details of construction and the arrangement of components set forth in the following description or illustrated in the following drawings. Other embodiments are possible and the embodiments described are capable of being practiced or of being carried out in various ways.

It should also be noted that a plurality of hardware and software based devices, as well as a plurality of different structural components may be used to implement various embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. Therefore, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

Figure 1:
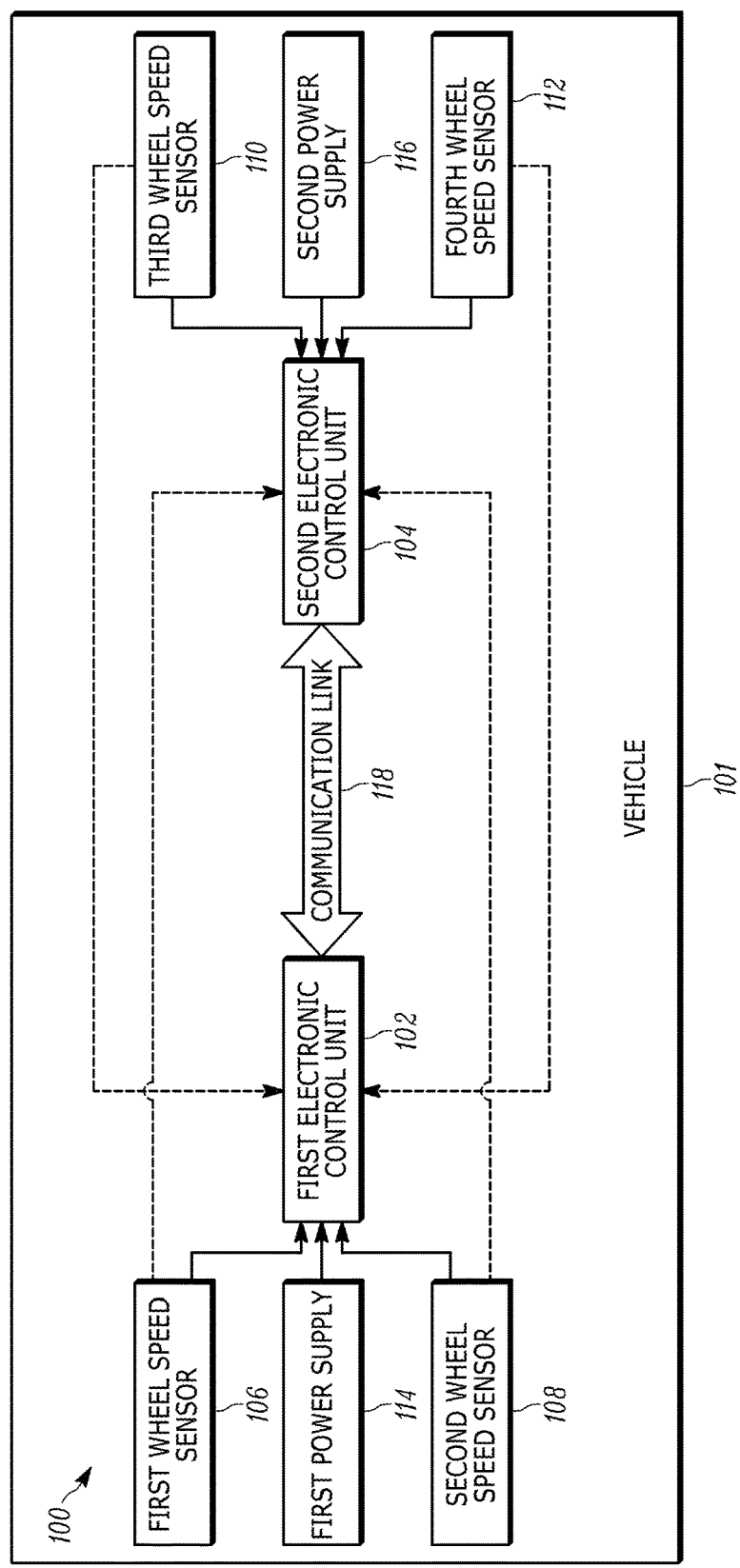
FIG. 1 is a schematic block diagram of a braking system according to one embodiment.

FIG. 1 schematically illustrates an example braking system 100 of a vehicle 101 according to some embodiments. In some embodiments, the vehicle 101 is an autonomous vehicle. In one example, the braking system 100 includes a first (electronic control unit) ECU 102, a second ECU 104, a first wheel speed sensor 106, a second wheel speed sensor 108, a third wheel speed sensor 110, a fourth wheel speed sensor 112, a first power supply 114, and a second power supply 116. The first ECU 102 and the second ECU 104 are communicatively coupled to each other via a communication link 118. In other embodiments, particularly in vehicles with fewer or more than four wheels, a different number of components may be used.

In some embodiments, the first ECU 102 and the second ECU 104 include a plurality of electrical and electronic components that provide power, operational control, and protection to the components and modules within the first ECU 102 and the second ECU 104. The first ECU 102 and the second ECU 104 each include, among other things, an electronic processing unit (e.g., a microprocessor or another suitable programmable device), non-transitory memory (e.g., a computer-readable storage medium), and an input/output interface. The processing unit, the memory, and the input/output interface communicate over one or more control or data buses. It should be understood that the first ECU 102 and the second ECU 104 may include additional, fewer, or different components.

In some embodiments, the first ECU 102 and the second ECU 104 are each implemented partially or entirely on a semiconductor (e.g., a field-programmable gate array ("FPGA") semiconductor) chip. The memory of the first ECU 102 and the second ECU 104 can include a program storage area and a data storage area. The program storage area and the data storage area can include combinations of different types of memory, such as read-only memory ("ROM"), random access memory ("RAM"), or other suitable memory devices. The processing unit executes computer readable instructions ("software") stored in the memory. The software can include firmware, one or more applications, program data, filters, rules, one or more program modules, and other executable instructions. For example, the software can include instructions and associated data for controlling systems of the vehicle 101, such as the braking system 100.

The first ECU 102 may be at least part of a primary braking system of the vehicle while the second ECU 104 is at least part of a secondary braking system of the vehicle. In some embodiments, the second ECU 104 is an electromechanical brake booster.

Each of the wheel speed sensors 106, 108, 110, and 112 is associated with and located in proximity to one of the wheels (not shown) of the vehicle 101. Each of the wheel speed sensors 106, 108, 110, and 112 monitors the speed of an individual wheel and provides information (or data) indicative of the wheel speed to the first ECU 102 and the second ECU 104. Various vehicle sub-systems (not shown) use the wheel speed information for each individual wheel to monitor or control vehicle performance. The first wheel speed sensor 106 and the second wheel speed sensor 108 are directly coupled to and powered by the first ECU 102. The third wheel speed sensor 110 and the fourth wheel speed sensor 112 are directly coupled to and powered by the second ECU 104. The first ECU 102 receives wheel speed data from the first wheel speed sensor 106 and the second wheel speed sensor 108 and the second ECU receives wheel speed data from the third wheel speed sensor 110 and the fourth wheel speed sensor 112.

The first power supply 114 is directly coupled to the first ECU 102 to provide power to the first ECU 102. Likewise, the second power supply 116 is directly coupled to the second ECU 104 to provide power to the second ECU 104. The first power supply 114 and the second power supply 116 operate independently of each other such that one may provide power when the other is unable to, for example, because of a malfunction.

The communication link 118 may be a data bus, wired, wireless, or optical connection that enables the components to communicate with each using, for example, network communications protocols, for example, the CAN protocol. In some embodiments, the communication link 118 is controller area network bus or a deterministic communication bus such as a FlexRay bus. In some embodiments, the first ECU 102 and the second ECU 104 are synchronized and exchange information synchronously over the communication link 118. The first ECU 102 and the second ECU 104 synchronize upon powering on the first ECU 102 and the second ECU 104 maintain synchronous communication while on.

Figure 2:
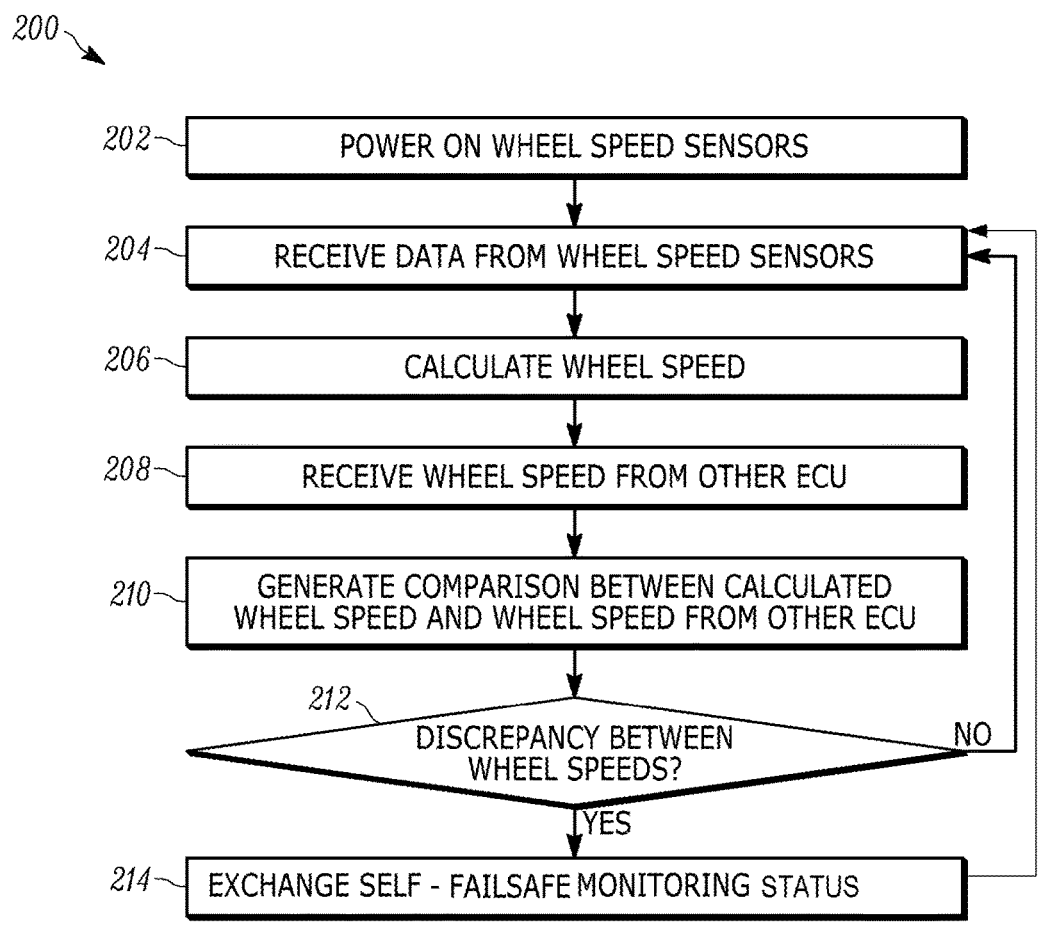
FIG. 2 is a flowchart illustrating a method of operating the braking system of FIG. 1.

FIG. 2 schematically illustrates a method 200 of operating the braking system 100 of FIG. 1. At block 202, the first ECU 102 provides power to the first wheel speed sensor 106 and the second wheel speed sensor 108 and the second ECU 104 provides power to the third wheel speed sensor 110 and the fourth wheel speed sensor 112. At block 204, the first ECU 102 and the second ECU 104 each receive wheel speed data from the first wheel speed sensor 106, the second wheel speed sensor 108, the third wheel speed sensor 110, and the fourth wheel speed sensor 112. At block 206, the first ECU 102 calculates, from the wheel speed data, a first wheel speed, a second wheel speed, a third wheel speed, and a fourth wheel speed. Likewise, the second ECU 104 calculates, from the wheel speed data, a secondary first wheel speed, a secondary second wheel speed, a secondary third wheel speed, and a secondary fourth wheel speed.

At block 208, the first ECU 102 and the second ECU 104 exchange the calculated wheel speeds with each other over the communication link 118. The first ECU 102 transmits to the second ECU 104 the first wheel speed, the second wheel speed, the third wheel speed, and the fourth wheel speed and the second ECU 104 transmits to the first ECU 102 the secondary first wheel speed, the secondary second wheel speed, the secondary third wheel speed, and the secondary fourth wheel speed. At block 210, the first ECU 102 and the second ECU 104 each, after receiving the calculated wheel speeds from the other, compare each of the calculated wheel speeds to the corresponding calculated wheel speed received from the other ECU. For example, the first ECU 102 compares the first wheel speed to the secondary first wheel speed, the second wheel speed to the secondary second wheel speed, the third wheel speed to the secondary third wheel speed, and the fourth wheel speed to the secondary fourth wheel speed.

At block 212, each of the first ECU 102 and the second ECU 104 determines a discrepancy in the comparisons (for example, if the wheel speeds of the comparison do not match). In the case of a discrepancy, both ECUs 102 and 104 exchange a self-failsafe monitoring status (block 214). The self-failsafe monitoring status corresponds to the self-data monitoring and individual failsafe monitoring information described in more detail below in regard to FIG. 3. By exchanging such self-diagnostic information, it can be determined which between the first electronic control unit and the second electronic control unit is experiencing a failure and which of the two calculated wheel speeds is more reliable. After exchanging the self-failsafe monitoring status, the method 200 may return to block 204. When both wheel speeds match (for example, within a predetermined deviation), the wheel speed monitoring continues again at block 204.

FIG. 3 illustrates a table that illustrates one example of redundant self-data monitoring and individual failsafe monitoring performed by the first ECU 102 and the second ECU 104. In the example, provided, the redundant self-data monitoring performed by both the first ECU 102 and the second ECU 104 for all four wheel speed sensors 106, 108, 110, and 112 includes wheel speed data calculation, wheel speed configuration, and direction information.

The first ECU 102 and the second ECU 104 each perform individual self-failsafe monitoring on the wheel speed sensors they are directly coupled to. The first ECU 102 performs self-failsafe monitoring for the first wheel speed sensor 106 and the second wheel speed sensor 108. The second ECU 104 performs the same self-failsafe monitoring for the third wheel speed sensor 110 and the fourth wheel speed sensor 112.

Individual self-failsafe monitoring includes, for example, wheel speed sensor testing, continuous voltage supply monitoring, line monitoring, air gap monitoring, pulse width monitoring, wheel speed monitoring, and high end timer buffer monitoring. Wheel speed sensor testing tests and verifies the supply voltage of the wheel speed sensors. Continuous voltage supply monitoring monitors the power supply (from the corresponding power supply 114 or 116) to the ECU. Line monitoring testing tests for electrical failures (for example, a short or open circuit) of the sensor between the voltage supply, signal, and the electric ground lines. Air gap monitoring verifies the distance between the wheel speed sensor and the tone ring is within a certain range for proper operation. The pulse width monitoring checks that the electrical signal from the wheel speed sensor has enough width (time) to be read properly. The wheel speed monitoring comparatively checks signals between the first, second, third, and fourth wheel speed sensors 106, 108, 110, and 112 to determine if the differences between the signals (i.e. time) are acceptable, for example, with respect to predetermined deviations or tolerances. The high end timer buffer monitor checks that the internal clock of the first ECU 102 and the second ECU 104 are not overflowing and are functioning properly.

The redundant self-data monitoring and individual failsafe monitoring ensures both the first ECU 102 and the second ECU 104 have wheel speed sensor information during both typical operating conditions and degraded failsafe situations. The first ECU 102 and the second ECU 104 exchange self-failsafe monitoring status information (relating to any detected self errors/malfunctions) with each other over the communication link 118. In one example, both the first ECU 102 and the second ECU 104 keep similar valid, suspicious, and invalid flags between them. By exchanging self-failsafe monitoring status information between the first ECU 102 and the second ECU 104, both the ECUs 102 and 104 can determine the accuracy/validity of information received from the other ECU over the communication link 118. In some embodiments, the first ECU 102 and the second ECU 104 exchange self-data monitoring statuses repeatedly after a predetermined time number of seconds, for example 5 ms.

In some embodiments, the first ECU 102 and the second ECU 104 perform individual power supply monitoring. As noted, the first ECU 102 is powered by the first power supply 114 and the second ECU 104 is powered by the second power supply 116. Both the ECUs 102, 104 monitor the power supply they are connected to (114 and 116 respectively.) The ECUs 102, 104 each determine, from the power supply monitoring of their power supply, a supply monitoring status for the first power supply 114 and the second power supply 116. The ECUs 102 and 104 exchange the supply monitoring status of the corresponding power supply 114 and 116.

Power supply monitoring may include, for example, validation that the voltage supply to the first ECU 102 and the second ECU 104 is within a threshold or predetermined tolerance. In the case that the voltage supply of either ECU 102 or 104 is above or below a threshold, the ECU is shut down. The ECUs 102 and 104 may additionally be configured to monitor voltage supplied from the communication link 118 (for example, in the case the communication link 118 is a vehicle network bus) to be within a maximum and minimum threshold. Both ECUs 102 and 104 may further monitor voltage supplied to their internal components and devices they are connected to. For example, the second ECU 104 may be connected to a temperature sensor and/or a position sensor monitoring the temperature and/or position of a brake booster of the second ECU 104. Similar to embodiments discussed above in regard to the self-failsafe monitoring, the ECUs 102 and 104 exchange individual power supply monitoring status information with each other over the communication link 118. In some embodiments, the first ECU 102 and the second ECU 104 exchange battery supply monitoring statuses after every predetermined number of seconds, for example 5 ms.

Thus, embodiments provide, among other things, systems and methods for redundant wheel speed sensing. Various features and advantages of certain embodiments are set forth in the following claims.

What is claimed is:

1. A braking system of a vehicle comprising:
a first electronic control unit connected to a first power supply;
a second electronic control unit connected to a second power supply, the second electronic control unit communicatively coupled to the first electronic control unit;
a first wheel speed sensor;
a second wheel speed sensor;
a third wheel speed sensor; and
a fourth wheel speed sensor;
wherein the first wheel speed sensor and the second wheel speed sensor are directly coupled to and powered by the first electronic control unit and are communicatively coupled to the second electronic control unit;
the third wheel speed sensor and the fourth wheel speed sensor are directly coupled to and powered by the second electronic control unit and are communicatively coupled to the first electronic control unit;
the first electronic control unit configured to calculate a first wheel speed, a second wheel speed, a third wheel speed, and a fourth wheel speed from the first wheel speed sensor, the second wheel speed sensor, the third wheel speed sensor, and the fourth wheel speed sensor;
the second electronic control unit configured to calculate a secondary first wheel speed, a secondary second wheel speed, a secondary third wheel speed, and a secondary fourth wheel speed from the first wheel speed sensor, the second wheel speed sensor, the third wheel speed sensor, and the fourth wheel speed sensor; and at least one of the first electronic control unit and the second electronic control unit is further configured to generate a comparison of at least one of the first wheel speed, the second wheel speed, the third wheel speed, or the fourth wheel speed to at least one of the corresponding secondary first wheel speed, secondary second wheel speed, the secondary third wheel speed, or the secondary fourth wheel speed;
determine a discrepancy between the comparison;
exchange a self-failsafe monitoring status; and
determine, from the self-failsafe monitoring status, which between the first electronic control unit and the second electronic control unit is experiencing a failure.

2. The braking system of claim 1, wherein the first electronic control unit and the second electronic control unit are each configured to perform self-data monitoring and self-failsafe monitoring.

3. The braking system of claim 2, wherein the first electronic control unit and the second electronic control unit each exchange information regarding self-data processing and self-failsafe monitoring to each other.

4. The braking system of claim 1, wherein self-failsafe monitoring includes at least one selected from a group consisting of wheel speed sensor testing, continuous voltage supply monitoring, line monitoring, air gap monitoring, and pulse width monitoring.

5. The braking system of claim 1, wherein the first electronic control unit and the second electronic control unit communicate with each other via either a controller area network bus or a deterministic communication bus.

6. The braking system of claim 1, wherein the first electronic control unit and the second electronic control unit are synchronized with each other such that data is exchanged between them repeatedly after each of a predetermined time.

7. The braking system of claim 1, wherein the first electronic control unit is a primary vehicle stability system electronic control unit of the vehicle and the second electronic control unit is a secondary brake force booster electronic control unit.

8. The braking system of claim 1, wherein at least one of the first electronic control unit or the second electronic control unit is an electromechanical brake booster electronic control unit.

9. A method of operating a braking system, the method comprising:
providing power from a first power supply to a first electronic control unit;
providing, from the first electronic control unit, power to a first wheel speed sensor and a second wheel speed sensor, the first wheel speed sensor and the second wheel speed sensor directly coupled to the first electronic control unit;
providing power from a second power supply to a second electronic control unit, the second electronic control unit communicatively coupled to the first electronic control unit;
providing, from the second electronic control unit, power to a third wheel speed sensor and a fourth wheel speed sensor directly coupled to the second electronic control unit;
receiving, at the first electronic control unit, data from the first wheel speed sensor, the second wheel speed sensor, the third wheel speed sensor, and the fourth wheel speed sensor;
calculating from the data, with an electronic processor, a first wheel speed, a second wheel speed, a third wheel speed, and a fourth wheel speed;
transmitting, from the first electronic control unit to the second electronic control unit, the first wheel speed, the second wheel speed, the third wheel speed, and the fourth wheel speed;
receiving, at the second electronic control unit, second data from the first wheel speed sensor, the second wheel speed sensor, the third wheel speed sensor, and the fourth wheel speed sensor;
calculating, from the second data, with a second electronic processor a secondary first wheel speed, a secondary second wheel speed, a secondary third wheel speed, and a secondary fourth wheel speed;
transmitting, from the second electronic control unit to the first electronic control unit, the secondary first wheel speed, the secondary second wheel speed, the secondary third wheel speed, and the secondary fourth wheel speed;
generating a comparison of at least one of the first wheel speed, the second wheel speed, the third wheel speed, or the fourth wheel speed to at least one of the corresponding secondary first wheel speed, secondary second wheel speed, the secondary third wheel speed, or the secondary fourth wheel speed;
determining a discrepancy between the comparison;
exchanging a self-failsafe monitoring status; and
determining, from the self-failsafe monitoring status, which between the first electronic control unit and the second electronic control unit is experiencing a failure.

10. The method of claim 9 further comprising, synchronizing communication between the first electronic control unit and the second electronic control unit upon powering on the first electronic control unit and the second electronic control unit and maintaining synchronous communication between the first electronic control unit and the second electronic control unit.

11. A braking system of a vehicle comprising:
a first electronic control unit connected to a first power supply;
a second electronic control unit connected to a second power supply, the second electronic control unit communicatively coupled to the first electronic control unit;
a first wheel speed sensor;
a second wheel speed sensor;
a third wheel speed sensor; and
a fourth wheel speed sensor;
wherein the first wheel speed sensor and the second wheel speed sensor are directly coupled to and powered by the first electronic control unit and are communicatively coupled to the second electronic control unit;
the third wheel speed sensor and the fourth wheel speed sensor are directly coupled to and powered by the second electronic control unit and are communicatively coupled to the first electronic control unit;
the first electronic control unit configured to calculate a wheel speed based on data from at least one of the wheel speed sensors
the second electronic control unit configured to calculate a secondary wheel speed based on data from at least one of the wheel speed sensors; and
at least one of the first electronic control unit and the second electronic control unit is further configured to generate a comparison of the wheel speed and the secondary wheel speed;
determine a discrepancy between the comparison;

exchange a self-failsafe monitoring status; and
determine, from the self-failsafe monitoring status, which between the first electronic control unit and the second electronic control unit is experiencing a failure.

\* \* \* \* \*